United States Patent
Hirose et al.

(10) Patent No.: US 8,039,742 B2
(45) Date of Patent: Oct. 18, 2011

(54) SUPERCONDUCTIVE CABLE

(75) Inventors: Masayuki Hirose, Osaka (JP); Ryosuke Hata, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1174 days.

(21) Appl. No.: 11/791,947

(22) PCT Filed: Oct. 31, 2005

(86) PCT No.: PCT/JP2005/020018
§ 371 (c)(1),
(2), (4) Date: May 31, 2007

(87) PCT Pub. No.: WO2006/059446
PCT Pub. Date: Jun. 8, 2006

(65) Prior Publication Data
US 2008/0121411 A1 May 29, 2008

(30) Foreign Application Priority Data
Dec. 1, 2004 (JP) .................. 2004-349170

(51) Int. Cl.
*H01B 12/00* (2006.01)
(52) U.S. Cl. .................... 174/15.5; 174/125.1
(58) Field of Classification Search ........... 174/15.4, 174/15.5, 125.1; 29/599; 505/230, 231
See application file for complete search history.

(56) References Cited

U.S. PATENT DOCUMENTS

| | | | |
|---|---|---|---|
| 3,604,833 A | 9/1971 | Beck | |
| 3,749,811 A * | 7/1973 | Bogner et al. | 174/15.5 |
| 4,845,308 A * | 7/1989 | Womack et al. | 174/15.4 |
| 4,994,633 A | 2/1991 | Puhn | |
| 5,932,523 A | 8/1999 | Fujikami et al. | |
| 6,262,375 B1 * | 7/2001 | Engelhardt et al. | 174/125.1 |
| 7,237,317 B2 * | 7/2007 | Schippl | 29/599 |
| 7,371,968 B1 * | 5/2008 | Hennessy | 174/125.1 |
| 2004/0058822 A1 | 3/2004 | Ohmatsu | |

FOREIGN PATENT DOCUMENTS

| | | |
|---|---|---|
| CN | 1489769 | 4/2004 |
| JP | 56-120887 A | 9/1981 |
| JP | 59-73694 U | 5/1984 |
| JP | 09-152089 A | 6/1997 |
| JP | 09-153311 A | 6/1997 |
| JP | 09-184594 A | 7/1997 |
| SU | 553946 | 4/1977 |

OTHER PUBLICATIONS

Chinese Office Action dated Jan. 23, 2009.
Decision on Grant of corresponding Russian application No. 2007124654/09(026841) with translation. (11 pgs.)

* cited by examiner

*Primary Examiner* — Ishwarbhai Patel
(74) *Attorney, Agent, or Firm* — Foley & Lardner LLP

(57) ABSTRACT

A superconductive cable capable of promoting a heat insulating function by a heat insulating tube. A heat insulating tube contained within a cable core of a superconductive cable includes a first metal tube and a second metal tube and a third metal tube arranged from an inner side in a diameter direction. An inner side heat insulating portion is formed between the first metal tube and the second metal tube, and an outer side heat insulating portion is formed on an inner side of the third metal tube and on an outer side of the inner side heat insulating portion. A heat insulating function of the heat insulating portion on an outer side is set to be lower than a heat insulating function of the heat insulating portion on an inner side thereof.

11 Claims, 1 Drawing Sheet

SUPERCONDUCTIVE CABLE

TECHNICAL FIELD

The present invention relates to a superconductive cable formed by containing a cable core in a heat insulating tube.

RELATED ART

Generally, a superconductive cable is formed by containing a single-core cable or a cable core stranded together with pieces of constituent elements on an inner side of a heat insulating tube (refer to, for example, Patent Reference 1).

A cable core includes a former, a superconductor, an insulating layer, a shield layer, a protecting layer successively from a center side. As shown by FIG. 2, the heat insulating tube A is constituted by double metal tubes of an inner tube A1 and an outer tube A2, normally, both of the tubes use corrugated tubes constituted by a bellows shape in a longitudinal direction to make easy to bend. Further, a single-core or a cable core stranded together with pieces of constituent elements B is contained on an inner side of the inner tube A1. A refrigerant of liquid nitrogen or the like is made to flow in a clearance between the inner side of the inner tube A1 and the cable core B.

An interval between the inner tube A1 and the outer tube A2 is brought into a vacuumed state to improve heat insulating performance. Further, in order to prevent radiation heat from outside by way of the outer tube A2, an outer periphery of the inner tube A1 is provided with a laminated heat insulating layer by winding a heat insulating member A3 in a strip-like shape of super insulation or the like.

Patent Reference 1: Japanese Patent Laid-open Publication: JP-A-9-152089

DISCLOSURE OF THE INVENTION

Problems that the Invention is to Solve

According to the heat insulating tube constituted by the double tubes shown in FIG. 2, since the heat insulating member is interposed between the inner tube and the outer tube, at a bent portion of the cable, the heat insulating member is compressed by the inner tube and the outer tube. When the heat insulating member is brought into contact with the inner tube and the outer tube in this way, heat of outside is easy to be conducted from the outer tube to the inner tube by way of the heat insulating member to pose a problem that invaded heat is increased.

Further, according to a structure of a cable shown in Patent Reference 1, when a heat insulating portion of the heat insulating tube cannot be vacuumed to constitute a high vacuum degree at a laying site, there is also a case in which the cable is delivered after vacuuming the heat insulating tube at a high vacuum degree previously at a factory of fabricating the cable.

Further, in a case of delivering the cable in a vacuumed state, when the outer tube is destructed in transportation, there is a concern of breaking vacuum. When the heat insulating tube is destructed, vacuuming needs to be carried out again after repairing to recover the broken portion, and enormous time, labor, cost are taken for vacuuming.

It is a principal object of the invention to provide a superconductive cable capable of promoting a heat insulating function by a heat insulating tube. Further, it is other object thereof to provide a superconductive cable capable of maintaining a heat insulating function of a heat insulating tube at minimum even when an outer portion of the heat insulating tube is destructed in transportation.

Means for Solving the Problems

According to the invention, there is provided with a superconductive cable including: a cable core having a superconductor, and a heat insulating tube contained with the cable core, wherein the heat insulating tube is laminated with three or more of metal tubes having different diameters from an inner side in a diameter direction, and heat insulating portions are formed among the respective metal tubes.

Particularly preferably, there is constructed a constitution in which the heat insulating tube includes: a first metal tube, a second metal tube and a third metal tube arranged from the inner side in the diameter direction, an inner side heat insulating portion is formed between the first metal tube and the second metal tube, and an outer side heat insulating portion is formed on an inner side of the third metal tube and on an outer side of the inner side heat insulating portion.

The cable core may be constituted by a single-core or a structure of stranding together three cores. Further, there is pointed out a cable core, for example, including a former, a superconductor, an insulating layer, a shield layer, a protecting layer successively from a center thereof.

As the metal tube constituting the heat insulating tube, a flat tube may be used, or a corrugated tube may be used. It is preferable to use the corrugated tube for the metal tube in order to make a cable easy to bend.

Further, it is preferable that a material of the metal tube is constituted by any of a nonmagnetic material of stainless steel, Cu, a Cu alloy, Al, and an Al alloy.

It is preferable to provide a laminated heat insulating member of super insulation or the like between the respective metal tubes in order to prevent radiation heat from outside.

According to the invention, since the heat insulating tube is constituted by three or more of multiple tubes, a vacuum degree is prevented from being lowered by restraining hydrogen molecules included in air from outside from invading the innermost side heat insulating portion by the heat insulating portion on the outer side, and the heat insulating function of the innermost side heat insulating portion is maintained.

Further, since the heat insulating portion on the inner side is protected by the heat insulating portion on the outer side, even when the metal tube on the outer side is damaged, the heat insulating function of the heat insulating portion on the inner side is maintained. Particularly, when the heat insulating function of the heat insulating portion on the innermost side is set to be the highest, even when the heat insulating portion on an outer side thereof is destructed, a minimum heat insulating function can be maintained.

Further, even when a gas is generated from a heat insulating member provided at the respective heat insulating portions by using the cable for a long period of time, and the vacuum degree of the heat insulating portion is lowered (inner pressure is increased), the heat insulating function of a total of the heat insulating tube is maintained by the structure of the multiple layer heat insulating portion.

The respective heat insulating portions may be provided with the same degree of the heat insulating function, or the heat insulating function may be set to be reduced from the inner side to the outer side. When the heat insulating functions are made to be equivalent, the vacuum degrees may be set to the same degree, or may be adjusted to the same degree by a combination of the vacuum degree and the heat insulating member. When the heat insulating function is changed, while enabling to promote the heat insulating function of the total of the heat insulating tube, at the heat insulating portion on the outer side, since the vacuum degree can be set to be low (the inner pressure can be set to be high), vacuuming can easily be carried out.

For example, when the heat insulating tube includes the first metal tube and the second metal tube and the third metal tube and the inner side heat insulating portion and the outer side heat insulating portion are formed by the metal tubes, in the heat insulating functions of the inner side heat insulating portion and the outer side heat insulating portion, the heat insulating function of the outer side heat insulating portion is set to be lower than the heat insulating function of the inner side heat insulating portion. In this case, by bringing the inner side heat insulating portion into the highly vacuumed state and setting the outer side heat insulating portion to a vacuum degree lower than the vacuum degree of the inner side heat insulating portion (making a pressure of the outer side heat insulating portion higher than that of the inner side heat insulating portion), a main heat insulating portion is constituted by the inner side heat insulating portion and an auxiliary heat insulating portion is constituted by the outer side heat insulating portion.

Further, when the metal tubes are constituted by a triple structure, by the outer side heat insulating portion, the heat insulating function of the inner side heat insulating portion can be restrained from being reduced by invasion of hydrogen molecules included in air from outside, and the heat insulating function of the total of the heat insulating tube can be promoted by the structure of the double heat insulating portion.

Particularly, when a thickness of the heat insulating layer of the outer side heat insulating portion is made to be large, that is, the clearance between the second metal tube and the third metal tube is made to be large, heat insulation of the inner side heat insulating portion by the outer side heat insulating portion can further effectively be carried out. At this occasion, it is preferable to interpose a spacer for maintaining the clearance at a predetermined interval along with the heat insulating member between the second metal tube and the third metal tube.

Further, when the heat insulating function of the outer side heat insulating portion is made to be lower than the heat insulating function of the inner side heat insulating portion, it is preferable to make vacuuming easy to carry out by reducing an amount of the heat insulating member provided at the outer side heat insulating portion and increasing the clearance between the second metal tube and the third metal tube.

By thickening a thickness of the layer of the outer side heat insulating portion and setting an amount of the heat insulating member arranged at inside thereof to be smaller than the thickness of the heat insulating layer, when the outer side heat insulating portion is vacuumed, the predetermined vacuum degree can be reached in a short period of time. When the outer side heat insulating portion is constituted in this way, even when the outer side heat insulating portion is destructed, in vacuuming after repair, the predetermined vacuum degree can be reached by a short period of time.

Further, according to the invention, it is preferable to make a length in an axial direction of the inner side heat insulating portion shorter than a length of the cable core and make a length of the outer side heat insulating portion longer than a length of the inner side heat insulating portion.

By constituting in this way, since the length of the outer side heat insulating portion in a longitudinal direction of the cable can be made to be longer than the length of the inner side heat insulating portion, the inner side heat insulating portion can completely be covered by the outer side heat insulating portion and the inner side heat insulating portion can further firmly be protected by the outer side heat insulating portion.

When the length of the inner side heat insulating portion is made to be shorter than the length of the outer side heat insulating portion as described above, it is preferable to make a length of the second metal tube in the longitudinal direction of the cable shorter than a length of actually laying the cable core. At this occasion, it is preferable to form the inner side heat insulating portion by closing the clearance between the first metal tube and the second metal tube at both end portions in the longitudinal direction of the second metal tube to be hermetically closed and vacuum the inner side heat insulating portion. According to the invention, the inner side heat insulating portion is vacuumed not at the laying site but at a factory of fabricating the cable previously in order to achieve the high vacuum degree.

When the inner side heat insulating portion is formed in this way, the length of the inner side heat insulating portion in the longitudinal direction of the cable becomes shorter than the length of actually laying the cable core. Further, the actually laying length refers to a length of the cable core after laying and connecting the cable core.

By making the length in the axial direction of the inner side heat insulating portion shorter than the length of actually laying the cable core and vacuuming the inner side heat insulating portion, even when the cable core is cut to the actually laying length at the laying site, it is not necessary to cut to remove the end portion of the inner side heat insulating portion at the laying site. As a result, in transporting the cable, since vacuum of the inner side heat insulating portion is not broken at any time of transporting the cable, laying the cable, and connecting the cable, the heat insulating function can always be maintained, and it is not necessary to vacuum the inner side heat insulating portion after connecting the cable.

Further, when the inner side heat insulating portion is not cut and the cable core is cut at the laying site, there is a case of cutting also the first metal tube and the third metal tube along with the cable core. In that case, before cutting the first metal tube and the third metal tube, an inert gas of nitrogen gas or the like is injected under a pressure equal to or higher than an atmospheric pressure, and in cutting, the cutting is carried out while injecting the inert gas such that a gas including moisture is not brought into the outer side heat insulating portion to carry out connection and after finishing the connection, vacuuming is carried out again.

Further, when the first metal tube and the third metal tube are also cut along with the cable core at the laying site, it is preferable to vacuum the outer side heat insulating portion or fill the inert gas to the outer side heat insulating portion in transporting the cable.

When the outer side heat insulating portion is vacuumed in transporting the cable, the outer side heat insulating portion is formed to be hermetically closed by closing the clearance between the first metal tube and the third metal tube on the outer sides of the both ends in the longitudinal direction of the second metal tube at the factory of fabricating the cable to be vacuumed. The vacuuming in this occasion may be carried out under a high temperature atmosphere in order to vaporize moisture in the heat insulating portion.

When the outer side heat insulating portion is made to be in vacuum in transporting the cable, at the laying site, operation of cutting and connecting the outer side heat insulating portion is carried out while injecting the inert gas to the outer side heat insulating portion in the vacuumed state and vacuuming is carried out again after connecting the cable. At this occasion, when the heat insulating function of the outer side heat insulating portion is set to be lower than the heat insulating function of the inner side heat insulating portion, operation of vacuuming which is carried out after cutting and connecting the outer side heat insulating portion can be carried out in a short period of time. Further, when the outer side heat insulating portion is brought into a vacuumed state in which moisture is hardly present in transporting the cable, even when the heat insulating function of the outer side heat insulating portion is set to be high, the operation of vacuuming which is carried out after cutting and connecting the outer side heat insulating portion can be carried out in a short period of time.

Further, when the outer side heat insulating portion is filled with the inert gas in transporting the cable, the outer side heat insulating portion is formed to be hermetically closed by closing the clearance between the first metal tube and the third metal tube on the outer sides of the both ends in the longitudinal direction of the second metal tube at the factory of fabricating the cable and is filled with the inert gas at a pressure equal to or higher than the atmospheric pressure. In this case, it is preferable to vacuum the outer side heat insulating portion before filling the inert gas and fill the inert gas. Also vacuuming at this occasion may be carried out under a high temperature atmosphere in order to vaporize moisture in the heat insulating portion.

When the outer side heat insulating portion is filled with the inert gas to make the pressure higher than the atmospheric pressure in this way, invasion of hydrogen molecules included in air from outside by passing the metal tube can be prevented during a time period until laying the cable. Further, when the outer side heat insulating portion is vacuumed and thereafter filled with the inert gas previously at the factory, vacuuming can be carried out such that moisture is not present in vacuuming again the outer side heat insulating portion at the laying site.

Further, although nitrogen gas, helium gas or the like is pointed out as the inert gas, it is preferable to use nitrogen gas in view of safety, cost or the like.

According to the invention, it is further preferable to make the length of the heat insulating tube shorter than the length of an actually laying the cable core and vacuum the respective heat insulating portions. Particularly, when the heat insulating tube is constituted by the triple tubes, it is the most preferable to form the heat insulating tube by making the length of the second metal tube shorter than the length of the first metal tube and the third metal tube. In the case of the triple tubes, the inner side heat insulating portion is formed in the hermetically closed state by closing the clearance between the first metal tube and the second metal tube by the both end portions in the longitudinal direction of the second metal tube. Further, the outer side heat insulating portion is formed to be in the hermetically closed state by closing the clearance between the first metal tube and the third metal tube on the outer sides on the both ends in the longitudinal direction of the second metal tube. It is preferable to vacuum the inner side heat insulating portion under the high temperature atmosphere and vacuum the outer side heat insulating portion under the high temperature atmosphere in order to vaporize moisture in the heat insulating portions.

By making the length of the heat insulating tube shorter than the length of actually laying the cable core and vacuuming the respective heat insulating portions in this way, the cable can be laid and connected while maintaining the vacuumed state of the respective heat insulating portions. As a result, not only the heat insulating portion on the inner side can be protected by the heat insulating portion on the outer side but also it is not necessary to vacuum again the respective heat insulating portions to thereby improve the operational efficiency.

Further, in a case in which the heat insulating portion on the outer side is destructed in transporting the cable, when the vacuum degree of the heat insulating portion on the outer side is set to be lower than the vacuum degree of the heat insulating portion, and when the destructed heat insulating portion on the outer side is vacuumed after connect the cable, operation of vacuuming can be carried out in a short period of time by using a small-sized vacuuming apparatus which can carry out the vacuuming operation also at the laying site.

The superconductive cable according to the invention can be utilized for either of an alternating current cable and a direct current cable. Further, the superconductive cable of the invention is preferably used as the direct current cable since energy loss thereof is smaller than that of the alternating current cable, and invasion of heat from outside to the cable core can excellently be restrained in comparison with the conventional heat insulating tube constituted by the double tubes. Further, an alternating current superconductive cable line can be formed or a direct current superconductive cable line can be formed by using the superconductive cable of the invention. Further, the heat insulating tube of the superconductive cable of the invention constitutes the heat insulating portion without putting a liquid refrigerant to inside thereof.

Advantage of the Invention

According to the invention, since the heat insulating tube is constituted by three or more of the multiple tubes, the heat insulating portions can individually be constituted from the inner side to the outer side in the diameter direction. As a result, invasion of heat from outside of the cable core can be restrained by multiple stages of the structure of the multiple heat insulating portions and the heat insulating function of the total of the heat insulating tube can be promoted more than the conventional double tubes.

Further, since invasion of hydrogen molecules included in air from outside to the innermost side heat insulating portion is restrained by the heat insulating portion on the outer side, the heat insulating function of the innermost side heat insulating portion can be maintained. In addition thereto, even when a gas is generated from the heat insulating members or the like provided at the respective heat insulating portions and the vacuum degree of the heat insulating portions is lowered (the inner pressure is increased) by using the cable for a long period of time, the heat insulating function of the total of the heat insulating tube can be maintained by the structure of the multiple heat insulating portions.

Further, by the heat insulating portion on the outer side, since the heat insulating portion on an inner side thereof can be protected, even when the outermost metal tube is damaged, the metal tube on the inner side can be prevented from being damaged and the heat insulating function of the heat insulating portion on the inner side can be maintained.

Further, when the length of the heat insulating tube is made to be shorter than the length of actually laying the cable core and the respective heat insulating portions are vacuumed, the cable can be laid and connected while maintaining the vacuumed state of the respective heat insulating portions without cutting the heat insulating tube. As a result, it is not necessary to vacuum again the respective heat insulating portions after connecting the cable and the operational efficiency is improved.

According to the invention, although the heat insulating tube is constituted by the structure of the multiple tubes so that the outer diameter is increased, since invasion of heat to the cable core can be restrained more excellently than that of the conventional heat insulating structure by the double tubes by the multiple heat insulating structure, the invention is effective when applied to the direct current superconductive cable.

Further, when end portions of the superconductive cable are connected, normally, a case in a cylindrical shape is provided to cover the connected exposed cable core and an end portion of the case is connected to an outer face of the end portion of the heat insulating tube by welding.

At this occasion, according to the conventional heat insulating tube having the structure of the double tubes, a base in a ring-like shape is attached to the outer tube and the case is fixed to the outer tube by welding by way of the base such that the outer tube is not destructed at a welded portion. Since a position of the base attached to the outer tube needs to be set in accordance with a length of the exposed portion and a size of the case, the attaching operation is complicated.

However, according to the invention, since the heat insulating tube is constituted by triple or more of the multiple structure, even when the outermost metal tube is destructed at the welded portion, the heat insulating function of the innermost side heat insulating portion can be maintained and therefore, the conventionally used base can be dispensed with.

Figure 1:
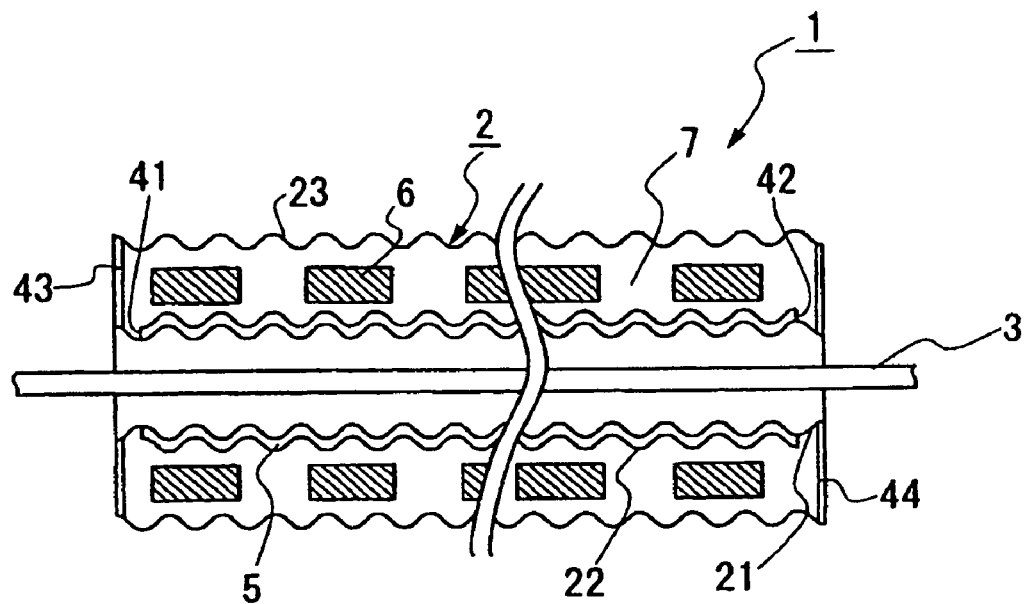
FIG. 1 is an outline sectional view showing both end portions of a superconductive cable according to the invention.
Figure 2:
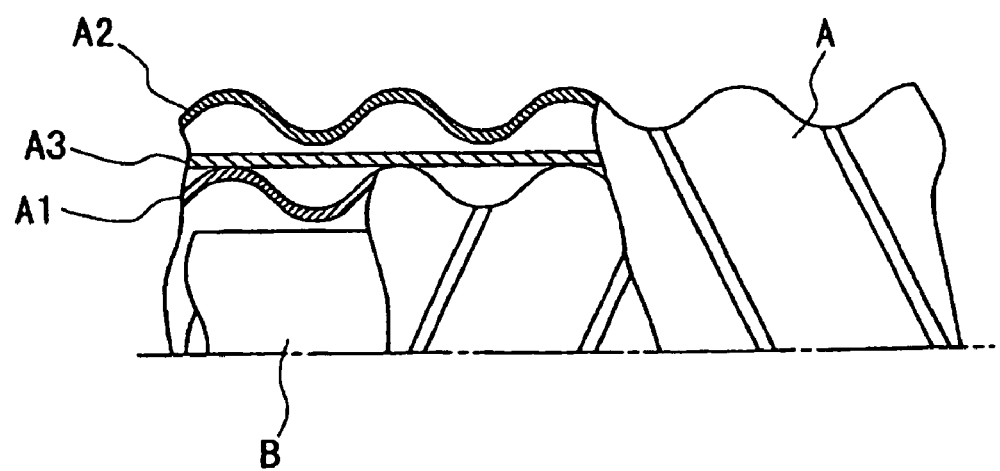
FIG. 2 is an outline sectional view of a conventional superconductive cable.

DESCRIPTION OF REFERENCE NUMERALS AND SIGNS 1 superconductive cable
2 heat insulating tube
21 first metal tube, 22 second metal tube, 23 third metal tube
3 cable core
41 first ring member, 42 second ring member
43 third ring member, 44 fourth ring member
5 inner side heat insulating portion
6 spacer
7 outer side heat insulating portion

BEST MODE FOR CARRYING OUT THE INVENTION

An embodiment of a superconductive cable according to the invention will be explained as follows. FIG. 1 is an outline sectional view of both end portions of a superconductive cable according to the invention.
[Total Structure]

The superconductive cable 1 used in the embodiment is contained with the single-core cable core 3 at inside of the heat insulating tube 2 and is used for a direct current cable. FIG. 1 shows an outline sectional view of the superconductive cable 1, and a length of the heat insulating tube 2 is made to be shorter than a length of the cable core 3.
[Cable Core]

The cable core 3 contained at inside of the heat insulating tube 2 includes a former, a superconductor layer, an insulating layer, an outer conductor layer, a protecting layer successively from a center thereof, although not illustrated.

As the former, a solid one stranded together with metal wires, or a hollow one using a metal pipe can be utilized. As a superconductor used in respective conductor layers, a tape wire member constituted by covering an oxide high temperature superconductor of a bismuth species superconductor or the like by a silver sheath is preferable. A conductor is constituted by winding the tape wire member on the former in multilayers.

The insulating layer is formed at an outer periphery of the superconductor. The insulating layer uses kraft paper, insulating paper constituted by laminating kraft paper by a polypropylene film (for example, PPLP: registered trade mark made by Sumitomo Denki Kogyo K.K.) or the like and can be constituted by being wound around the outer periphery of the superconductor. Further, according to the embodiment, three cores of the cable cores having the above-described constitution stranded together may be contained at inside of the insulating tube.
[Heat Insulating Tube]

The heat insulating tube 2 is provided with triple tubes constituted by laminating the first metal tube 21, the second metal tube 22, the third metal tube 23 having different tube diameters from an inner side in a diameter direction. The metal tubes are respectively constituted by corrugated tubes formed by stainless steel.

According to the embodiment, a length of a tube of the second metal tube 22 is the shortest, and the first metal tube 21 and the third metal tube 23 are constituted by the same length. Further, with regard to the lengths of the first metal tube 21 and the third metal tube 23, the first metal tube 21 may be made to be shorter than the third metal tube 23. According to the embodiment, the lengths of the first metal tube 21 and the third metal tube 23 are made to be shorter than a length of actually laying the cable core, the length of the second metal tube 22 constitutes a length of the inner side heat insulating portion 5, mentioned later, and the length of the first metal tube 21 and the third metal tube 23 constitutes a length of the outer side heat insulating portion 7.

In a state of arranging the second metal tube 22 at a middle position of the first metal tube 21 to be spaced apart from each other, at one end of the second metal tube 22, a clearance between the first metal tube 21 and the second metal tube 22 is closed by the first ring member 41 in a plate-like shape, and other end of the second metal tube 22 is closed by the second ring member 42 in a plate-like shape. According to the embodiment, a hermetically closed space is formed by the first metal tube 21, the second metal tube 22, the first ring member 41, and the second ring member 42, and the hermetically closed space is made to constitute the inner side heat insulating portion 5.

The hermetically closed space is arranged with so-to-speak super insulation (laminated heat insulating member) laminated with a net-like member made of plastic and a metal foil before being hermetically closed, although not illustrated. Further, after hermetically closing the clearance between the first metal tube 21 and the second metal tube 22, the inner side heat insulating portion 5 is vacuumed under high temperature to constitute a highly vacuumed state.

Next, super insulation is arranged (not illustrated) at an outer periphery of the first metal tube 21 at a portion thereof which is not laminated with the second metal tube 22 and an outer periphery of the second metal tube 22, the wire-like spacer 6 having a section in a rectangular shape is spirally wound around an outer periphery of the super insulation, and the third metal tube 23 is arranged at outer peripheries of the heat insulating member and the spacer 6. At this occasion, an amount of the super insulation is made to be as thin as possible such that a flow path of air produced at a clearance between the second metal tube 22 and the third metal tube 23 is widened.

In a state of producing a predetermined clearance between the third metal tube 23 and the second metal tube 22 by the spacer 6, both ends of the third metal tube 23 and the first metal tube 21 are closed by the third ring member 43 and the fourth ring member 44 in a plate-like shape. According to the embodiment, the outer side heat insulating portion 7 is constituted by a hermetically closed space formed by the third metal tube 23, the first ring member 41, the second ring member 42, the third ring member 43, the fourth ring member 44, a portion of the first metal tube 21, and the second metal tube 22. Further, after hermetically closing the outer side heat insulating portion 7, the outer side heat insulating portion 7 is brought into a highly vacuumed state by vacuuming.

According to the embodiment, the outer side heat insulating portion 7 is made to be easy to be vacuumed by making the clearance between the second metal tube 22 and the third metal tube 23 considerably larger than a size of the clearance between the first metal tube 21 and the second metal tube 22.

Further, at a laying site, the cable core 3 is connected while maintaining the vacuumed state of the inner side heat insulating portion 5 and the outer side heat insulating portion 7, the exposed cable core 3 is covered by a case for connection, although not illustrated, and an end portion of the case is fixed to an end portion of the third metal tube 23. When the cable core is connected in this way, since the inner side heat insulating portion 5 and the outer side heat insulating portion 7 are not cut, the vacuumed state of the inner side heat insulating portion 5 and the outer side heat insulating portion 7 is maintained, and it is not necessary to vacuum again the inner side heat insulating portion 5 and the outer side heat insulating portion 7.

According to the embodiment, since the heat insulating tube is constituted by the structure of the triple tubes, the inner side heat insulating portion and the outer side heat insulating portion can be constituted individually in the diameter direction, and by two stages of heat insulation of the outer side heat insulating portion and the inner side heat insulating portion, the heat insulating function of a total of the heat insulating tube can be promoted by restraining invasion of heat from outside to the cable core.

Particularly, since the heat insulating members are interposed between the respective metal tubes to be vacuumed, the heat insulating function of the total of the heat insulating tube can be promoted more than the heat insulating tube by the conventional double tubes.

Although the invention has been explained in details and in reference to the specific embodiment, it is apparent for the skilled person that the invention can variously be changed or modified without deviating from the spirit and the range of the invention.

Further, the application is based on Japanese Patent Application (Japanese Patent Application No. 2004-349170) filed on Dec. 1, 2004 and a content thereof is incorporated herein by reference.

INDUSTRIAL APPLICABILITY

The superconductive cable of the invention is preferably used as a direct current superconductive cable.

The invention claimed is:

1. A superconductive cable comprising:
a cable core having a superconductor, and
a heat insulating tube containing the cable core,
wherein the heat insulating tube is formed by three or more of metal tubes having different diameters from an inner side in a diameter direction, and heat insulating portions are formed among the respective metal tubes, and
wherein a length of a heat insulating portion on an inner side in a longitudinal direction of the cable is made to be shorter than a length of the cable core, and a length of a heat insulating portion on an outer side is made to be longer than the length of the inner side heat insulating portion.

2. The superconductive cable according to claim 1, wherein a heat insulating function of the heat insulating portion on an outer side is set to be lower than a heat insulating function of the heat insulating portion on an inner side thereof.

3. The superconductive cable according to claim 1, wherein the heat insulating tube includes:
a first metal tube, a second metal tube and a third metal tube arranged from the inner side in the diameter direction,
an inner side heat insulating portion is formed between the first metal tube and the second metal tube, and
an outer side heat insulating portion is formed on an inner side of the third metal tube and on an outer side of the inner side heat insulating portion.

4. The superconductive cable according to claim 1, wherein the inner side heat insulating portion is formed by making a length of the second metal tube in the longitudinal direction of the cable shorter than a length of actually laying the cable core and closing a clearance between the first metal tube and the second metal tube at both end portions in the longitudinal direction of the second metal tube, and the inner side heat insulating portion is vacuumed.

5. The superconductive cable according to claim 4, wherein the outer side heat insulating portion is formed by closing a clearance between the first metal tube and the third metal tube on outer sides of the both ends of the second metal tube in the longitudinal direction in transporting the cable, and is vacuumed.

6. The superconductive cable according to claim 4, wherein the outer side heat insulating portion is formed by closing a clearance between the first metal tube and the third metal tube on outer sides of the both ends of the second metal tube in the longitudinal direction in transporting the cable, and is filled with an inert gas under a pressure equal to or higher than an atmospheric pressure.

7. The superconductive cable according to claim 6, wherein the inert gas is nitrogen gas.

8. The superconductive cable according to claim 1, wherein a length of the heat insulating tube is made to be shorter than a length of actually laying the cable core, and the respective heat insulating portions are vacuumed.

9. The superconductive cable according to claim 8, wherein the heat insulating tube includes: the first metal tube, the second metal tube and the third metal tube, a length of the second metal tube is made to be shorter than lengths of the first metal tube and the third metal tube, the inner side heat insulating portion is formed by closing a clearance between the first metal tube and the second metal tube at both end portions in a longitudinal direction of the second metal tube, and the outer side heat insulating portion is formed by closing a clearance between the first metal tube and the third metal tube on outer sides of the both ends in the longitudinal direction of the metal tube.

10. The superconductive cable according to claim 1, wherein a material of the metal of the heat insulating tube is any of stainless steel, Cu, a Cu alloy, Al, and an Al alloy.

11. The superconductive cable according to claim 1, wherein the superconductive cable is used as a direct current cable.

* * * * *